United States Patent
Sato et al.

(10) Patent No.: US 9,092,198 B2
(45) Date of Patent: Jul. 28, 2015

(54) ELECTRONIC DEVICE, OPERATION CONTROL METHOD, AND STORAGE MEDIUM STORING OPERATION CONTROL PROGRAM

(75) Inventors: Takayuki Sato, Yokohama (JP); Makiko Hoshikawa, Daito (JP); Tomohiro Shimazu, Daito (JP)

(73) Assignee: KYOCERA CORPORATION, Fushimi-Ku, Kyoto (JP)

( * ) Notice: Subject to any disclaimer, the term of this patent is extended or adjusted under 35 U.S.C. 154(b) by 33 days.

(21) Appl. No.: 13/403,455

(22) Filed: Feb. 23, 2012

(65) Prior Publication Data

US 2012/0218274 A1   Aug. 30, 2012

(30) Foreign Application Priority Data

Feb. 24, 2011  (JP) .................................. 2011-039094

(51) Int. Cl.
| | |
|---|---|
| G06F 3/14 | (2006.01) |
| G06F 1/16 | (2006.01) |
| G06F 3/0483 | (2013.01) |
| G06F 3/0488 | (2013.01) |

(52) U.S. Cl.
CPC .............. *G06F 1/169* (2013.01); *G06F 1/1626* (2013.01); *G06F 3/0483* (2013.01); *G06F 3/04883* (2013.01)

(58) Field of Classification Search
USPC .................................................. 715/862, 864
See application file for complete search history.

(56) References Cited

U.S. PATENT DOCUMENTS

| | | |
|---|---|---|
| 2003/0020687 A1 | 1/2003 | Sowden et al. |
| 2004/0026605 A1 | 2/2004 | Lee et al. |
| 2010/0125786 A1* | 5/2010 | Ozawa et al. ................. 715/702 |
| 2010/0175018 A1* | 7/2010 | Petschnigg et al. ........... 715/776 |
| 2011/0163967 A1* | 7/2011 | Chaudhri ...................... 345/173 |
| 2011/0167391 A1* | 7/2011 | Momeyer et al. ............. 715/863 |
| 2011/0296351 A1* | 12/2011 | Ewing et al. ................. 715/841 |
| 2012/0088553 A1* | 4/2012 | Nunes .......................... 455/566 |

FOREIGN PATENT DOCUMENTS

| | | |
|---|---|---|
| EP | 1241581 A1 | 9/2002 |
| JP | 2003140802 A | 5/2003 |
| JP | 200478957 A | 3/2004 |
| JP | 2007-264923 A | 10/2007 |

(Continued)

OTHER PUBLICATIONS

Tomer Moscovich, Contact area interaction with sliding widgets, UIST 2009 Proceeding of the 22$_{nd}$ annual ACM symposion, 2009, pp. 13-22.*

Office Action mailed Aug. 12, 2014, corresponding to Japanese patent application No. 2011-039094, for which an explanation of relevance is attached.

(Continued)

*Primary Examiner* — Linh K Pham
*Assistant Examiner* — Tam Tran
(74) *Attorney, Agent, or Firm* — Lowe Hauptman & Ham, LLP

(57) ABSTRACT

According to an aspect, an electronic device includes a display unit, a contact detecting unit, a housing, and a control unit. The display unit displays an image. The contact detecting unit detects a contact. The housing has a first face in which the display unit is provided and a second face in which the contact detecting unit is provided. When a contact operation is detected by the contact detecting unit while a first image is displayed on the display unit, the control unit causes the display unit to display a second image.

15 Claims, 6 Drawing Sheets

(56) References Cited

FOREIGN PATENT DOCUMENTS

| | | |
|---|---|---|
| JP | 2009164794 | 7/2009 |
| JP | 2010009014 | 1/2010 |
| JP | 2010-66947 A | 3/2010 |

OTHER PUBLICATIONS

Office Action mailed Mar. 24, 2015, corresponding to Japanese patent application No. 2011-039094, for which an explanation of relevance is attached.

* cited by examiner

ELECTRONIC DEVICE, OPERATION CONTROL METHOD, AND STORAGE MEDIUM STORING OPERATION CONTROL PROGRAM

CROSS-REFERENCE TO RELATED APPLICATIONS

This application claims priority from Japanese Application No. 2011-039094, filed on Feb. 24, 2011, the content of which is incorporated by reference herein in its entirety.

BACKGROUND

1. Technical Field

The present disclosure relates to an electronic device, an operation control method, and a storage medium storing therein an operation control program.

2. Description of the Related Art

Recently, touch panels are widely used in order to allow an intuitive operation and to realize a compact electronic device that does not include a device requiring a physically large area such as a keyboard. In an electronic device that includes a touch panel, a specific process is assigned to an operation such as a tap that is detected by the touch panel (for example, Japanese Patent Application Laid-Open No. 2009-164794). In addition, there are also electronic book viewers each displaying buttons on a touch panel and changing a display based on the operation of the buttons (for example, Japanese Patent Application Laid-Open No. 2010-009014).

However, the operations that are detected by the touch panel are no more than several kinds such as a tap, a flick, and a sweep. Accordingly, conventional electronic devices that include a touch panel cannot provide users with various operation methods. In addition, in a case where an electronic device displays buttons on a touch panel and controls the display based on the operation of the buttons, a user needs to memorize the operation of each button, and it is difficult for the user to perform an intuitive operation. Furthermore, in a case where buttons are displayed on the touch panel, an image cannot be displayed in an area corresponding thereto, and accordingly, the display area decreases.

For the foregoing reasons, there is a need for an electronic device, an operation control method, and a storage medium storing therein an operation control program that provide a user with various operation methods.

SUMMARY

According to an aspect, an electronic device includes a display unit, a contact detecting unit, a housing, and a control unit. The display unit displays an image. The contact detecting unit detects a contact. The housing has a first face in which the display unit is provided and a second face in which the contact detecting unit is provided. When a contact operation is detected by the contact detecting unit while a first image is displayed on the display unit, the control unit causes the display unit to display a second image.

According to another aspect, an operation control method executed by an electronic device including a first face and a second face. The method includes: displaying a first image on a display unit provided on the first face; detecting a contact operation by a contact detecting unit provided on the second face; and switching an image to be displayed on the display unit from the first image to a second image when the contact operation is detected by the contact detecting unit.

According to another aspect, a non-transitory storage medium stores therein an operation control program. When executed by an electronic device which includes a first face and a second face, the program for causes the electronic device to execute: displaying a first image on a display unit provided on the first face; detecting a contact operation by a contact detecting unit provided on the second face; and switching an image to be displayed on the display unit from the first image to a second image when the contact operation is detected by the contact detecting unit.

DETAILED DESCRIPTION

The present invention will be described in detail with reference to the drawings. It should be noted that the present invention is not limited by the following explanation. In addition, this disclosure encompasses not only the components specifically, described in the explanation below, but also those which would be apparent to persons ordinarily skilled in the art, upon reading this disclosure, as being interchangeable with or equivalent to the specifically described components.

In the following description, a mobile phone is used to explain as an example of the electronic device, however, the present invention is not limited to mobile phones. Therefore, the present invention can be applied to various types of devices (portable electronic devices and/or stationary electronic devices), including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
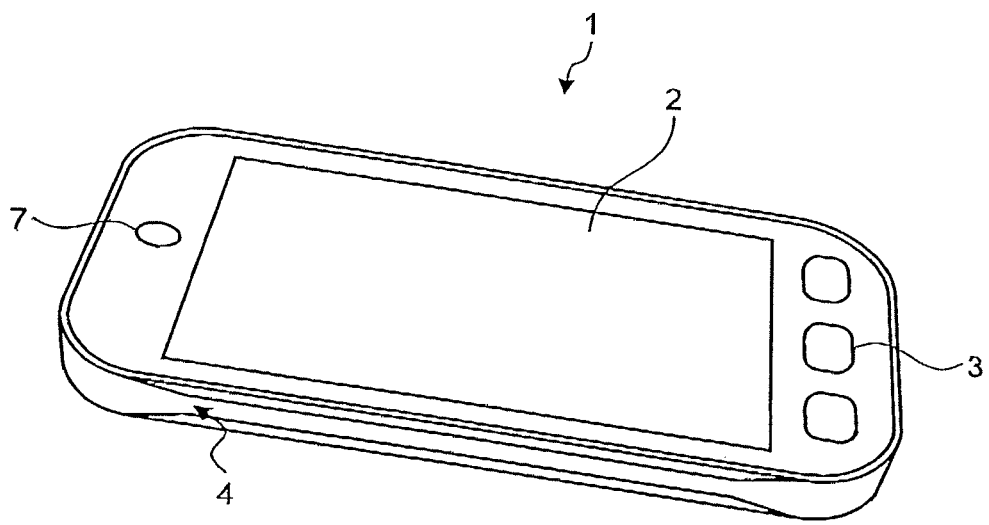
FIG. 1 is a perspective view of a mobile phone.
Figure 2:
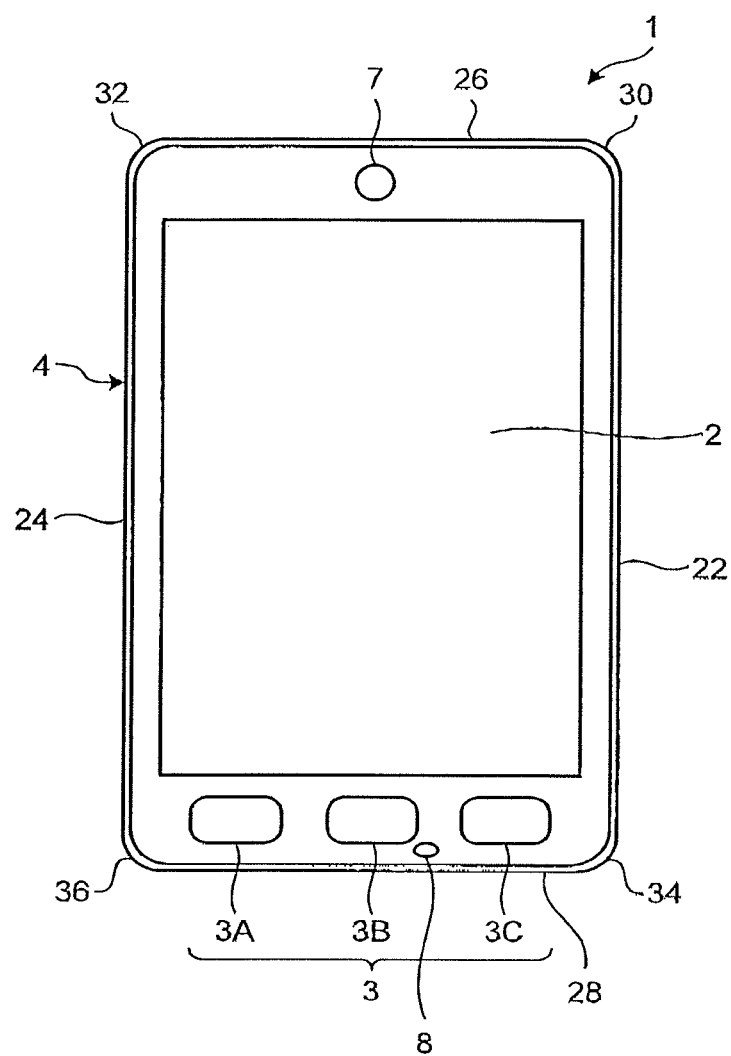
FIG. 2 is a front view of the mobile phone.

First, an overall configuration of a mobile phone 1 according to an embodiment will be described with reference to FIGS. 1 and 2. FIG. 1 is a perspective view of the mobile phone 1. FIG. 2 is a front view of the mobile phone 1. As illustrated in FIGS. 1 and 2, the mobile phone 1 includes a housing that has an approximately hexahedral shape having two faces the area of which is larger than that of the other faces, and a touch panel 2, an input unit 3, a contact sensor 4, a speaker 7, and a microphone 8 are provided on the surface of the housing.

The touch panel 2 is disposed on one of the faces (a front face, a first face) having the largest area. The touch panel 2 displays a text, a graphic, an image, or the like, and detects operations (gestures) performed by a user on the touch panel 2 by using his/her finger, a stylus, a pen, or the like (in the description herein below, for the sake of simplicity, it is assumed that the user touches the touch panel 2 with his/her fingers). The detection method of the touch panel 2 may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. The input unit 3 includes a plurality of buttons such as button 3A, button 3B, and button 3C to which predetermined functions are assigned. The speaker 7 outputs the voice of a call opponent and music or an effect sound reproduced by various programs, and the like. The microphone 8 acquires a voice at the time of a phone call or reception of an operation through the voice.

The contact sensor 4 is disposed on the whole circumference of a face (a side face, a second face) that is in contact with the face on which the touch panel 2 is disposed and detects operations that the user performs for the contact sensor 4 by using his/her finger. Hereinafter, for the description, on the assumption that a face on which the touch panel 2 is a front face, parts of the contact sensor 4 may be called as follows: a part that is disposed on the right side face may be called a right contact sensor 22; a part that is disposed on the left side face may be called a left contact sensor 24; a part that is disposed on the upper side face may be called an upper contact sensor 26; a part that is disposed on the lower side face may be called a lower contact sensor 28; a part that is disposed on the upper right side face may be called an upper right contact sensor 30; a part that is disposed on the upper left side face may be called an upper left contact sensor 32; a part that is disposed on the lower right side face may be called a lower right contact sensor 34; and a part that is disposed on the lower left side face may be called a lower left contact sensor 36. The detection method of the contact sensor 4 may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method.

The right contact sensor 22, the left contact sensor 24, the upper contact sensor 26, the lower contact sensor 28, the upper right contact sensor 30, the upper left contact sensor 32, the lower right contact sensor 34, and the lower left contact sensor 36 (hereinafter, these sensors as a whole may be simply referred to as "contact sensors") of the contact sensor 4 can detect contacts in a plurality of points. For example, in a case where two fingers are brought into contact with the right contact sensor 22, the right contact sensor 22 detects contacts of the fingers at each of positions with which the two fingers are brought into contact. In addition, the contact sensors include a plurality of measurement points in a direction perpendicular to the front face so that they can detect a change of contact (change of contact point) in the direction perpendicular to the front face.

The mobile phone 1 includes the contact sensor 4 in addition to the touch panel 2, and thus, as described below, a user is provided with various operation methods that are intuitive and superior in operability.

Figure 3:
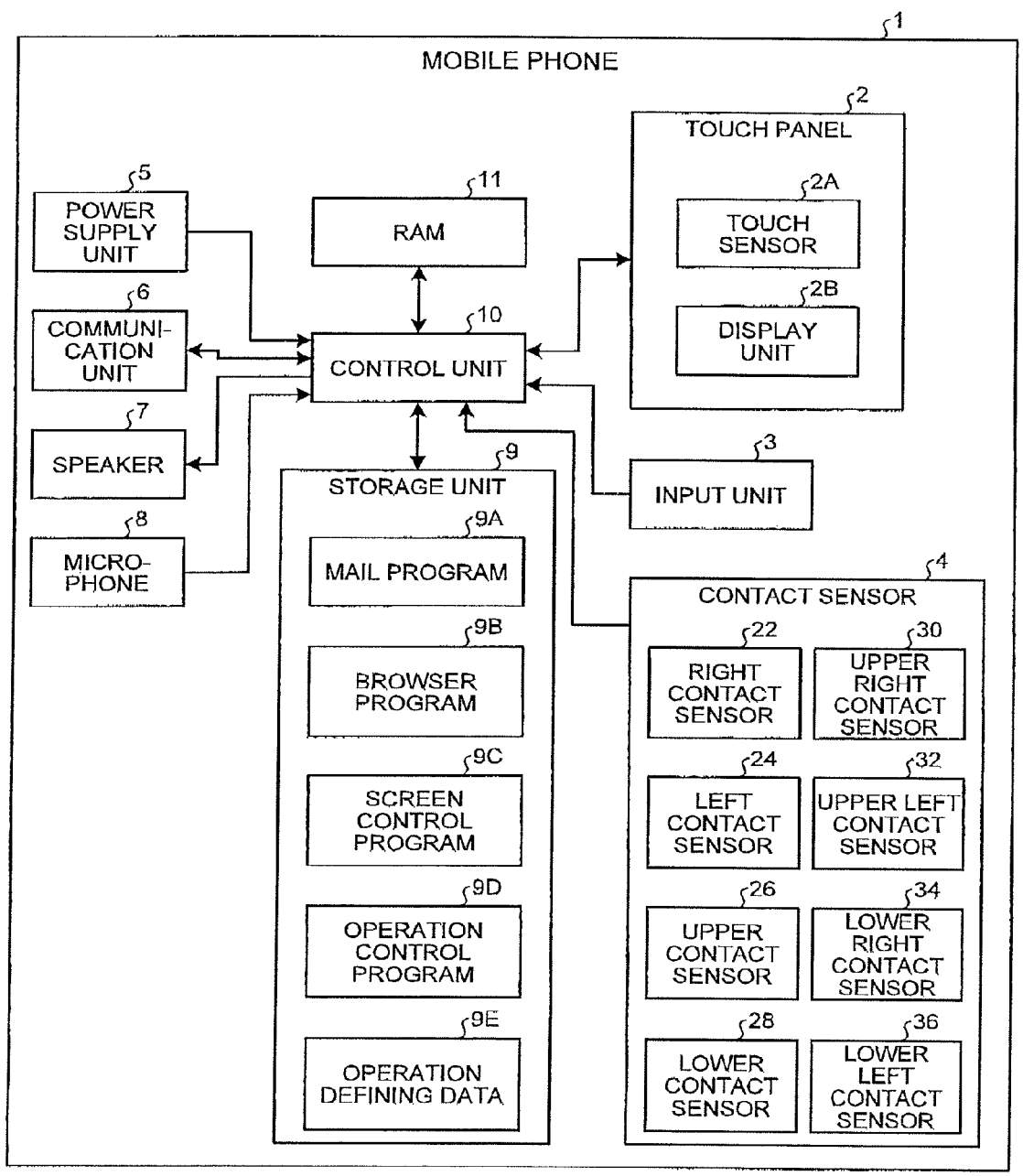
FIG. 3 is a block diagram of the mobile phone.

Next, the functional configuration of the mobile phone 1 will be described with reference to FIG. 3. FIG. 3 is a block diagram of the mobile phone 1. As illustrated in FIG. 3, the mobile phone 1 includes the touch panel 2, the input unit 3, the contact sensor 4, a power supply unit 5, a communication unit 6, the speaker 7, the microphone 8, a storage unit 9, a control unit 10, and random access memory (RAM) 11.

The touch panel 2 includes a display unit 2B and a touch sensor 2A that overlaps the display unit 2B. The touch sensor 2A detects an operation performed for the touch panel 2 by using finger as well as a position on the touch panel 2 at which the operation is performed and transmits a signal indicative thereof to the control unit 10. Examples of the operations detected by the touch sensor 2A include a tap operation and a sweep operation. The display unit 2B, for example, is configured by a liquid crystal display (LCD), an organic electroluminescence display (OELD), or the like and displays a text, a graphic, or the like.

The input unit 3 receives a user's operation through a physical button or the like and transmits a signal corresponding to the received operation to the control unit 10. The contact sensor 4 includes a right contact sensor 22, a left contact sensor 24, an upper contact sensor 26, a lower contact sensor 28, an upper right contact sensor 30, an upper left contact sensor 32, a lower right contact sensor 34, and a lower left contact sensor 36. The contact sensor 4 detects an operation performed for these sensors as well as the positions at which the operations are performed, and transmits a signal indicative thereof to the control unit 10. The power supply unit 5 supplies power acquired from a storage battery or an external power supply to each functional unit of the mobile phone 1 including the control unit 10.

The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs a sound signal transmitted from the control unit 10 as a sound. The microphone 8 converts the voice of a user or the like into a sound signal and transmits the converted sound signal to the control unit 10.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 10. The programs stored in the storage unit 9 include a mail program 9A, a browser program 9B, a screen control program 9C, and an operation control program 9D. The data stored in the storage unit 9 include operation defining data 9E. The storage unit 9 also stores therein other programs and data such as an operating system program that realizes the basic functions of the mobile phone 1, address book data, and the like. The storage unit 9 may be configured by a combination of a portable storage medium such as a memory card and a reading device of the storage medium.

The mail program 9A provides a function for realizing an e-mail function. The browser program 9B provides a function for realizing a Web browsing function. The screen control program 9C displays a text, a graphic, or the like on the touch panel 2 in cooperation with functions provided by the other programs. The operation control program 9D provides a function for performing processes according to contact operations detected by the touch sensor 2A and the contact sensor 4. The operation defining data 9E maintains a definition of a function that is activated in accordance with the detection result of the contact sensor 4.

The control unit 10, for example, is a central processing unit (CPU) and integrally controls the operations of the mobile phone 1 to realize various functions. More specifically, the control unit 10 controls the display unit 2B, the communication unit 6, and the like by executing a command included in the program stored in the storage unit 9 while referring to the data stored in the storage unit 9 or data loaded to RAM 11 as is necessary, thereby realizing various functions. The program executed or the data referred to by the control unit 10 may be configured to be downloaded from a server apparatus through wireless communication using the communication unit 6.

The control unit 10, for example, realizes the e-mail function by executing the mail program 9A. In addition, the control unit 10 realizes the function for performing a corresponding processes in accordance with various contact operations detected by the touch sensor 2A and the contact sensor 4 by executing the operation control program 9D. Furthermore, the control unit 10 realizes a function for displaying a screen and the like used for various functions on the touch panel 2 by executing the screen control program 9C. In addition, it is assumed that the control unit 10 can perform a plurality of programs in parallel with each other through a multitasking function provided by the operating system program.

The RAM 11 is used as a storage area in which commands of a program executed by the control unit 10, data referred to by the control unit 10, a calculation result of the control unit 10, and the like are temporarily stored.

Figure 4:
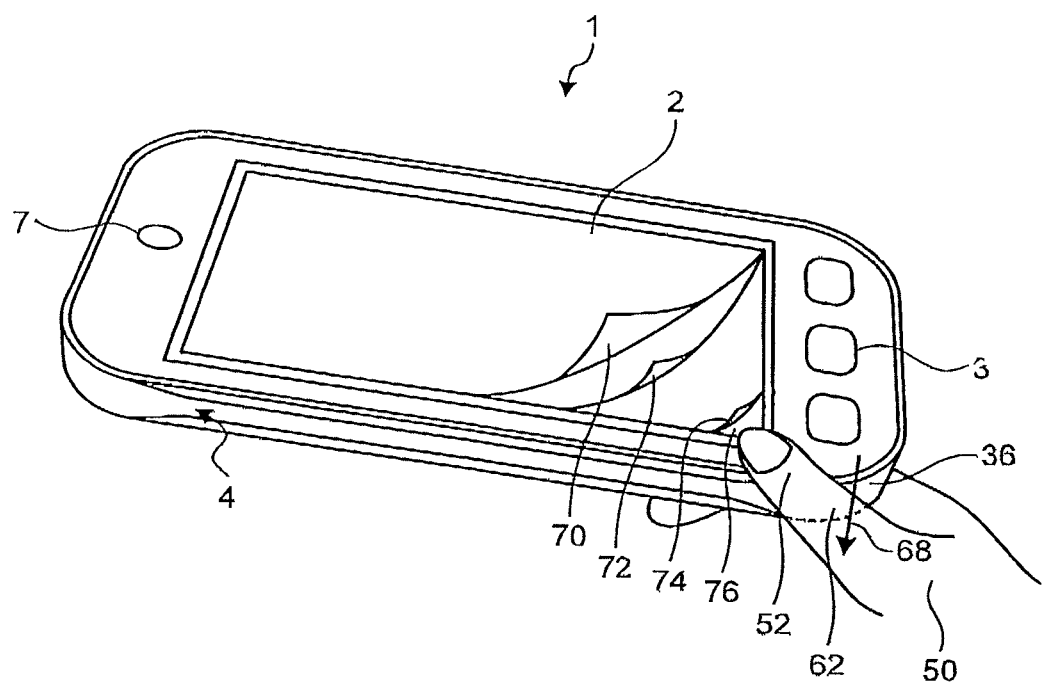
FIG. 4 is a diagram illustrating an example of control that is performed by a control unit in accordance with an operation detected by a contact sensor.

Next, an example of control that is performed by the control unit 10 in accordance with an operation detected by the contact sensor 4 will be described with reference to FIG. 4. FIG. 4 is a diagram illustrating an example of control that is performed by the control unit in accordance with an operation detected by the contact sensor. FIG. 4 schematically illustrates the relation among the contact sensor 4, a screen as an operation target, and a finger.

The mobile phone 1 illustrated in FIG. 4 is supported by a user's right hand 50 in a direction in which the shorter sides of the touch panel 2 are disposed in the vertical direction (upward or downward direction). More specifically, the housing of the mobile phone 1 is supported by being interposed between the thumb 52 and other fingers (mainly, an index finger) of the right hand 50. In addition, the user has the thumb 52 of the right hand to be brought into contact with the lower left contact sensor 36.

As above, in a case where the thumb 52 of the right hand 50 is brought into contact with the lower left contact sensor 36, in the mobile phone 1, as illustrated in FIG. 4, a contact of the thumb 52 at a contact point 62 is detected by the lower left contact sensor 36. The lower left contact sensor 36 detects a contact at the contact point 62. In addition, the user moves the contact point 62 in a direction of an arrow 68 while maintaining a state in which the thumb 52 is brought into contact with the lower left contact sensor 36, in other words, the user inputs a sliding operation for moving the thumb 52 in a direction separated away from the touch panel 2. When the sliding operation is input by the thumb 52, the mobile phone 1 detects the movement of the contact point 62 by using the lower left contact sensor 36.

When an image switching operation (specific contact operation) is detected by the contact sensor 4 as above, the control unit 10 switches an image displayed on the touch panel 2 based on the function provided by the operation control program 9D. Images displayed on the touch panel 2 are retrieved from an object (image unit) including a plurality of images and information of the sequence for displaying the images. FIG. 4 illustrates a case where the mobile phone 1 detects the image switching operation when an image 70 is displayed, and thereafter images are sequentially turned (sequentially switched) in such a manner an image 72 is displayed after the image 70, an image 74 is displayed after the image 72, and an image 76 is displayed after the image 74. When the image to be displayed is switched, the mobile phone 1 transforms the image to reproduce the behaviors occurring in sheets in a case where the stacked sheets are tuned. When the input of the image switching operation is completed in the state illustrated in FIG. 4, in other words, when the sliding operation of the thumb 52 is stopped, the mobile phone 1 displays the image 76 on the touch panel 2.

As above, when an image switching operation is detected by the contact sensor 4, the mobile phone 1 changes the image displayed on the touch panel 2. More specifically, the mobile phone 1 performs a process (page turning process) of turning a plurality of images whose display sequence is set, in other words, pages of an image unit including a plurality of pages. Accordingly, the user can perform the process of turning the pages of the object through a simple operation. In addition, the sliding operation is input to the lower left contact sensor 36 corresponding to the corner of the housing and the corner of the image, and thus the operation feeling of the input operation and the process that is performed can be closer to each other than the case where the process of turning the pages is associated with another operation such as a clicking operation of a button, a sliding operation of a finger on the touch panel 2, and the like. The mobile phone 1 allows the user to turn pages though the sliding operation that is similar to the operation of turning pages by sliding a finger at the end of a book or a sheet bundle. Accordingly, an intuitive operation can be performed.

In addition, when an image switching operation is detected by the contact sensor 4 and a process of changing an image to be displayed is performed, as illustrated in FIG. 4, the mobile phone 1 preferably displays an animation (moving image) ox an image representing the turn of images (pages) on the touch panel 2. Accordingly, the mobile phone 1 can allow the user to intuitively understand that a sliding operation is input, and the pages are turned (switching between images is performed).

The image unit as a target for switching between images through the image switching operation may be a plurality of images whose display sequence is set, and various image units can be used. For example, the image unit may be an object for displaying data of a plurality of images stored in one folder. The image unit may be an object for displaying document data or a presentation material of a plurality of pages. Alternatively, the image unit may be an object for displaying each page of a book as an image.

The mobile phone 1 may determine the feed amount of images, that is, the number of switched images based on the amount of sliding or the sliding time of a sliding operation input in the image switching operation. In a case, as in the present embodiment, where a sliding operation is performed in a direction perpendicular to the front face is detected, an operation of repeatedly bringing the thumb 52 into contact with the same position of the lower left contact sensor 36 may be detected as a sliding operation. In this case, the number of contacts of the finger may be calculated as the amount of sliding.

The mobile phone 1 preferably adjusts the switching speed of images (the number of switched screens), that is, the feed amount of pages based on the operation speed of the sliding operation. More specifically, it is preferable that, the higher the movement speed of the sliding operation is, the higher the switching speed of images becomes. In other words, even if the amount of sliding (the amount of movement of a finger) of the sliding operation is the same, it is preferable that, the higher the speed of the sliding operation is, the more images are turned, in other words, a state is formed in which an further image in display sequence is displayed. Accordingly, the switching speed of images can be appropriately adjusted.

The mobile phone 1, as in this embodiment, may perform an image switching operation only for a sliding operation detected by the lower left contact sensor 36 of the contact sensor 4. Through this, various processes can be assigned to other operations including the sliding operations for the other contact sensors that can be detected by the contact sensor 4. The image switching operation is not limited to the sliding operation detected by the lower left contact sensor 36, and a sliding operation detected at an arbitrary part of the contact sensor 4 may be determined as the image switching operation to acquire the above-described advantages. It is preferable that a sliding operation detected by one of the upper right contact sensor 30, the upper left contact sensor 32, the lower right contact sensor 34, and the lower left contact sensor 36 is determined as the image switching operation. Through this, the image switching operation can be configured as an operation close to the operation of turning pages by touching the corners of sheets.

Figure 5:
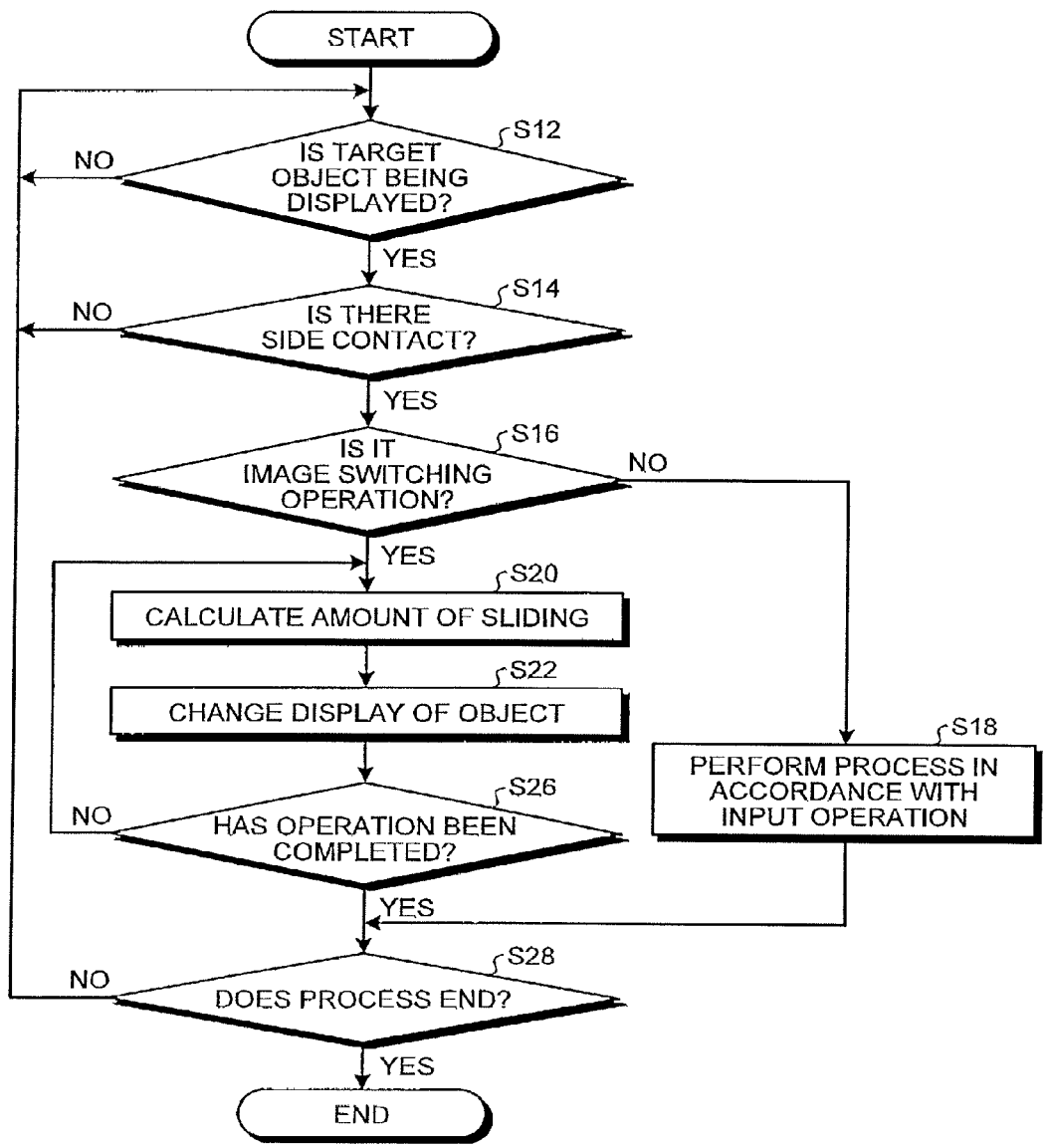
FIG. 5 is a flowchart illustrating an operation of the mobile phone.

Next, the operation of the mobile phone 1 at the time of detecting a contact operation will be described with reference to FIG. 5. FIG. 5 is a flowchart illustrating an operation of the mobile phone. The processing sequence illustrated in FIG. 5 is repeatedly performed based on the function provided by the operation control program 9D.

The control unit 10 of the mobile phone 1 determines whether a target object is being displayed, at Step S12. The target object is an object that can be set as an operation target through an image switching operation. When it is determined that the target object is not being displayed (No) at Step S12, the control unit 10 proceeds to Step S12. In other words, the control unit 10 repeats the process of Step S12 until a state is formed in which the target object is displayed.

When it is determined that the target object is being displayed at Step S12, the control unit 10 determines whether there is a side contact, in other words, whether a contact on either one side face is detected by the contact sensor 4, at Step S14. When it is determined that there is no side contact (No) at Step S14, in other words, that a contact on the side face is not detected, the control unit 10 proceeds to Step S12. When it is determined that there is a contact on the side face (Yes) at Step S14, in other words, that a contact on the side face is detected, the control unit 10 determines whether it is an image switching operation, at Step S16.

Figure 6:
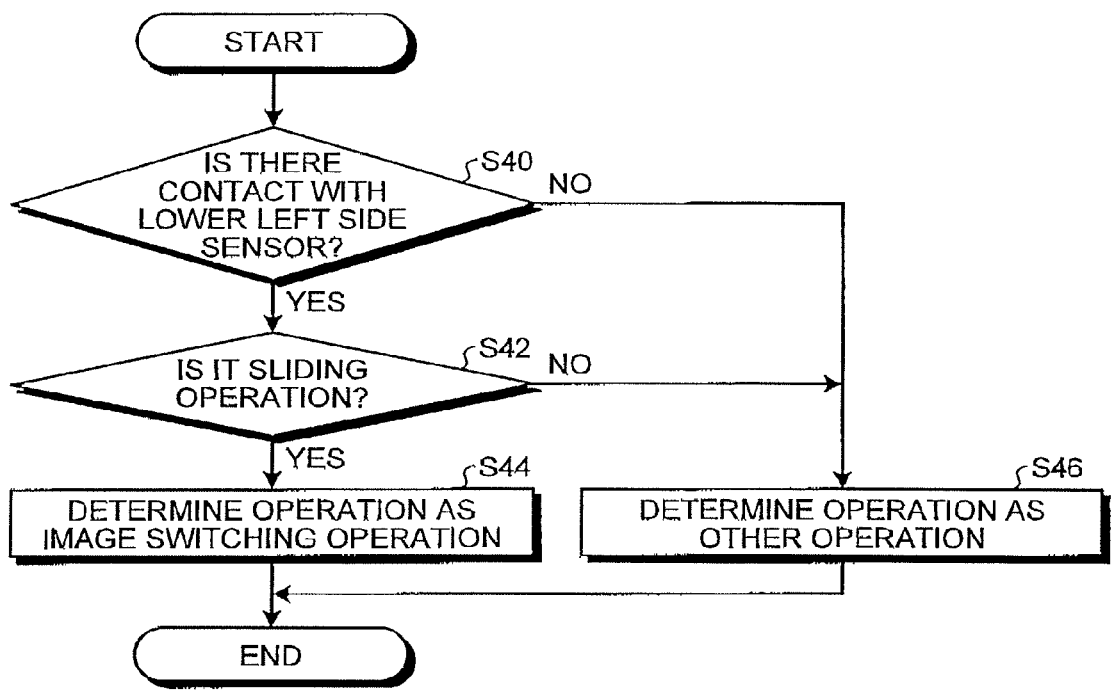
FIG. 6 is a flowchart illustrating an operation of the mobile phone.

The determination of Step S16 will be described with reference to FIG. 6. FIG. 6 is a flowchart illustrating an operation of the mobile phone. FIG. 6 illustrates the operation in a case where the operation illustrated in FIG. 4 (a sliding operation for the lower left contact sensor 36) is defined as the image switching operation. The control unit 10 determines whether there is a contact on the lower left contact sensor 36 at Step S40. In other words, it is determined whether a contact is detected by the lower left contact sensor 36. When it is determined that there is no contact on the lower left contact sensor 36 (No) at Step S40, the control unit 10 proceeds to Step S46.

When it is determined that a contact is detected by the lower left contact sensor 36 (Yes) at Step S40, the control unit 10 determines whether it is a sliding operation at Step S42. When determining that it is not the sliding operation (No) at Step S42, the control unit 10 proceeds to Step S46.

When determining that it is the sliding operation (Yes) at Step S42, the control unit 10 determines that the detected operation is an image switching operation, at Step S44. When No is determined at Step S40 or S42, the control unit 10 determines that it is a different operation, in other words, that it is an operation other than the image switching operation, at Step S46. When the process of Step S44 or S46 is performed, the control unit 10 completes this determination process. The control unit 10 changes the determination manner in accordance with the operation defined as the image switching operation.

Referring back to FIG. 5, the description of this process will be continued. When it is determined that there is no image switching operation (No) at Step S16, the control unit 10 performs a process according to the input operation at Step S18. More specifically, the control unit 10 specifies a process to be performed by comparing the correspondence relation stored in the operation defining data 9E and the input operation. Thereafter, the control unit 10 performs the specified process and proceeds to Step S28.

When it is determined that the image switching operation is detected (Yes) at Step S16, the control unit 10 calculates the amount of sliding, at Step S20. In other words, the amount of movement of the contact point detected by the lower left contact sensor 36 is calculated. When the amount of sliding is calculated at Step S20, the control unit 10 changes the display of the object, at Step S22. More specifically, the control unit 10 calculates the amount of switching of images, the number of the sheets beyond which an image to be displayed is positioned, in other words, the number of sheets of images to be turned, based on the amount of sliding that is calculated at Step S20. Thereafter, the control unit 10 displays an image that is positioned beyond the calculated number of sheets on the touch panel 2 based on the calculated amount of switching. When changing the image to be displayed, as described above, an animation or an image representing the turn of the image is displayed.

When the process of Step S22 is performed, the control unit 10 determines whether the image switching operation has ended at Step S26. Whether an image switching operation ends can be determined by using various criteria, and, for example, in a case where a state is formed in which a contact is not detected by the contact sensor 4, the image switching operation can be determined to have ended.

When it is determined that there is no end of the image switching operation (No) at Step S26, the control unit 10 proceeds to Step S20. Until the image switching operation ends, the control unit 10 repeats the process of changing the display in accordance with the moving distance. When it is determined that the image switching operation has ended (Yes) at Step S26, the control unit 10 proceeds to Step S28.

When the process of Step S18 is performed, or in a case where Yes is determined at Step S26, the control unit 10 determines whether the process ends at Step S28, in other words, the detection of an operation using the contact sensor 4 ends. When it is determined that there is no end of the process (No) at Step S28, the control unit 10 proceeds to Step S12. When the end of the process is determined (Yes) at Step S28, the control unit 10 ends this process.

The mobile phone 1 according to the embodiment is configured to receive an operation for the side faces and perform a process in accordance with the operation received by the side face, thereby providing a user with various operation methods. In other words, as illustrated in FIG. 5, in a case where a contact detected by the contact sensor 4 is not the image switching operation, a process according to the input is performed, which allows the user to input various operations. For example, switching of display images corresponding to the calculated number of sheets can be performed for a sliding operation for the lower left contact sensor 36, and a process of moving the display position within the image currently displayed or a process of moving the cursor can be performed for a sliding operation for another contact sensor.

The aspects of the present invention that have been represented in the above-described embodiment can be arbitrarily modified in the range not departing from the spirit of the present invention.

Figure 7:
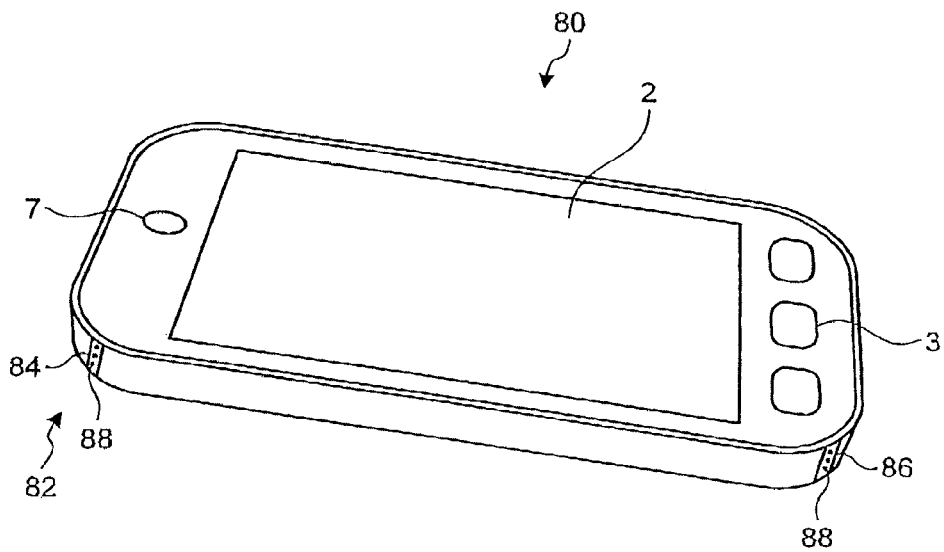
FIG. 7 is a perspective view of a mobile phone according to another embodiment.

In the above-described embodiment, the contact sensors 4 are arranged on four sides (four faces of the side faces) of the housing and areas (four places of connection portions of the sides of the side face) corresponding to four corners of the front face, however, the present invention is not limited thereto. The contact sensors that detect a contact on the side face may be arranged at necessary positions. FIG. 7 is a perspective view of a mobile phone according to another embodiment. For example, the mobile phone 80 illustrated in. FIG. 7 includes a contact sensor 82. The contact sensor 82 has a configuration in which contact sensors are arranged in areas (four connection portions of the sides of the side face) corresponding to four corners of the front face of the housing. In FIG. 7, out of four corners, only an upper left contact sensor 84 and a lower left contact sensor 86 are illustrated, and an upper right contact sensor and a lower right contact sensor are arranged as well. In the upper left contact sensor 84, as denoted by points in FIG. 7, detection elements 88 that detect contacts are arranged in a row in a direction perpendicular to the front face. In the lower left contact sensor 86, detection elements 88 that detect contacts are arranged in a row in a direction perpendicular to the front face. The upper left contact sensor 84 and the lower left contact sensor 86 detect contacts by using a plurality of detection elements 88 arranged in the direction perpendicular to the front face and accordingly, detects the movement of a finger in the direction perpendicular to the front face, whereby the above-described sliding operation can be detected. Even in a case where the contact sensors are arranged only in areas corresponding to four corners of the front face out of the side faces of the housing, the above-described image switching operation is detected, whereby the process of switching of images can be performed. The contact sensor 4 is not limited to the configuration in which the contact sensors are arranged at four corners, and the contact sensor that detects a contact may be disposed in at least one place on the side face.

The mobile phone 1 may be configured to perform a different process in accordance with the direction of the sliding operation. For example, as illustrated in FIG. 4, it may be configured such that a sliding operation performed in a direction perpendicular to the front face and in a direction separating away from the front face is detected as the image switching operation to perform the image switching process and a sliding operation performed in a direction perpendicular to the front face and in a direction toward the front face is detected as a different operation to perform a different process. In this case, as illustrated in FIG. 4, by setting the sliding operation performed in the direction perpendicular to the front face and in the direction separating away from the front face as an image switching operation, an operation can be input more intuitively.

In the above-described embodiment, since the operation can be intuitively input, the sliding operation performed in the direction perpendicular to the front face for the contact sensors located in areas corresponding to the four corners of the front face of the side face of the housing is set as the image switching operation, however, the present invention is not limited thereto. For example, a sliding operation, which is performed in the direction perpendicular to the front face, input to one of four sides (four faces of the side face) of the housing may be set as the image switching operation. The sliding direction (the movement direction of the finger and the contact point) of the sliding operation is not limited to the direction perpendicular to the front face, and a sliding operation performed in a direction parallel to the front face, that is, a direction parallel to the extending direction of the side face may be set as the image switching operation. Since the movement of a finger and the switching of images can be associated with each other, it is preferable that the sliding operation is set as an image switching operation, but a contact (for example, a contact at the same position) with the contact sensor may be set as the screen switching operation. In this case, by setting a contact with areas corresponding to four corners of the front face of the housing as the screen switching operation and setting a contact with the other contact sensors as another operation, various operations can be input. Furthermore, by setting a contact with the contact sensor as a screen switching operation, an operation similar to touching a side face of a sheet bundle or a book is set as the screen switching operation, whereby an intuitive operation can be input.

The portable electronic device according to the above-described embodiment is configured to change the whole area of the image display area, in other words, the image displayed on the touch panel is fully switched to the next image when the image switching operation is input, however, the present invention is not limited thereto. The portable electronic device may be configured to switch images located in a partial area of the image display area when the screen switching operation is input. In other words, it may be configured such that only a part of the image displayed on the touch panel is switched to the next image, and an image (image before switching) located in the other areas is displayed without any change. In this case, it is preferable that an image is changed only in a portion to which a screen switching operation is input, that is, an area (for example, a display area within a predetermined distance from the contact point or an area closest to the contact point out of areas acquired by dividing the display area into four in the vertical and horizontal directions) corresponding to a contact point.

In the above-described embodiment, an example has been described in which the present invention is applied to an electronic device that includes a touch panel as display means, however, the present invention can be applied to an electronic device including, as display means, a simple display panel that a touch sensor does not overlap as well.

The advantages are that one embodiment of the invention provides an electronic device, an operation control method, and a storage medium storing therein an operation control program that can provide a user with various operation methods and thereby allow the user to perform an intuitive operation.

What is claimed is:

1. An electronic device, comprising:
   a touch panel configured to display an image;
   a contact sensor configured to detect a contact;
   a housing having a front face in which the touch panel is provided and a side face in which the contact sensor is provided; and
   a control unit,
   wherein, in response to a sliding operation detected by the contact sensor while a first image, which is one of stacked images, is displayed on the touch panel, the control unit is configured to cause the touch panel to turn the first image to display a second image, which is another one of the stacked images, wherein
      the control unit is configured to cause, while the contact sensor is detecting the sliding operation, the touch panel to display portions of several images which are being turned, and
      the sliding operation contacts the contact sensor in the side face and slides on the contact sensor in the side face in a direction perpendicular to and away from the front face, wherein, in response to the contact sensor detecting a contact to the side face and sliding on the side face in a direction perpendicular to and toward the front face, the control unit is configured to perform a process other than an image switching operation of switching between images among the stacked images, wherein the side face is perpendicular to the front face, and wherein the contact sensor, in the direction perpendicular to the front face, has a first width at corners of the housing and a second width in a middle section between the corners.

2. The electronic device according to claim 1, wherein the control unit is configured to cause the touch panel to reproduce an appearance of turning images when the first image is switched to the second image.

3. The electronic device according to claim 2, wherein the control unit is configured to determine an image further from the first image in the sequence of the stacked images as the second image, as a movement amount of the sliding operation is increased.

4. The electronic device according to claim 1, wherein the control unit is configured to determine an image further from the first image in the sequence of the stacked images as the second image, as a movement speed of the sliding operation is increased.

5. The electronic device according to claim 1, wherein the control unit is configured to cause the touch panel to display sequentially the stacked images while the sliding operation is detected by the contact sensor.

6. The electronic device according to claim 5, wherein the control unit is configured to cause, when the sliding operation is no longer detected, the touch panel to display an image that is displayed last in accordance with the sliding operation.

7. The electronic device according to claim 1, wherein
the contact sensor is arranged in a first area adjacent to a first corner of the housing, and
the sliding operation is an operation that is input to the first area.

8. The electronic device according to claim 7, wherein
the contact sensor is further arranged in a second area adjacent to a second corner of the housing, and
the control unit is configured to perform a process other than the image switching operation when an operation is detected on the second area.

9. The electronic device according to claim 1, wherein
a display area of the touch panel is divided into a plurality of areas, and
the control unit is configured to cause, when the sliding operation is detected by the contact sensor, the touch panel to switch the first image to the second image in the area corresponding to a position where the sliding operation is detected.

10. The electronic device according to claim 1, further comprising an input unit including at least one button on the front face,
wherein, in a front view in which the touch panel is arranged above the at least one button, the contact sensor is arranged at a lower, left corner of the housing.

11. The electronic device according to claim 1, wherein the contact sensor is arranged only at corners of the housing.

12. The electronic device according to claim 1, wherein the first width is greater than the second width.

13. The electronic device according to claim 1, wherein,
in response to the contact sensor detecting a number of repeatedly performed contacts with the side face and sliding on the side face in the direction perpendicular to and away the front face,
the control unit is configured to determine a number of images to be switched based on the number of said repeatedly performed contacts.

14. An operation control method executed by an electronic device including a housing which has a front face and a side face, the method comprising:
displaying a first image, which is one of stacked images, on a touch panel provided on the front face;
detecting, by a contact sensor provided on the side face, a contact;
in response to the contact sensor detecting a first contact to the side face and sliding on the side face in a direction perpendicular to and away from the front face, turning the first image displayed on the touch panel to display a second image, which is another one of the stacked images, wherein, in said turning, the touch panel displays portions of several images which are being turned; and
in response to the contact sensor detecting a second contact to the side face and sliding on the side face in a direction perpendicular to and toward the front face, performing a process other than an image switching operation of switching between images among the stacked images,
wherein the side face is perpendicular to the front face, and
wherein the contact sensor, in the direction perpendicular to the front face, has a first width at corners of the housing and a second width in a middle section between the corners.

15. A non-transitory storage medium that stores an operation control program for causing, when executed by an electronic device which includes a housing which has a front face and a side face, the electronic device to execute:
displaying a first image, which is one of stacked images, on a touch panel provided on the front face;
detecting a contact by a contact sensor provided on the side face;
in response to the contact sensor detecting a first contact to the side face and sliding on the side face in a direction perpendicular to and away from the front face, turning the first image displayed on the touch panel to display a second image, which is another one of the stacked images, wherein, in said turning, the touch panel displays portions of several images which are being turned; and
in response to the contact sensor detecting a second contact to the side face and sliding on the side face in a direction perpendicular to and toward the front face, performing a process other than an image switching operation of switching between images among the stacked images,
wherein the side face is perpendicular to the front face, and
wherein the contact sensor, in the direction perpendicular to the front face, has a first width at corners of the housing and a second width in a middle section between the corners.

* * * * *